United States Patent
Liu et al.

(10) Patent No.: US 10,492,182 B2
(45) Date of Patent: Nov. 26, 2019

(54) METHOD AND DEVICE FOR DETERMINING UPLINK CONTROL CHANNEL

(71) Applicant: Telefonaktiebolaget LM Ericsson (publ), Stockholm (SE)

(72) Inventors: Jinhua Liu, Beijing (CN); Shaohua Li, Beijing (CN); Zhan Zhang, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/558,914

(22) PCT Filed: Aug. 31, 2017

(86) PCT No.: PCT/CN2017/099864
§ 371 (c)(1),
(2) Date: Sep. 15, 2017

(87) PCT Pub. No.: WO2018/059181
PCT Pub. Date: Apr. 5, 2018

(65) Prior Publication Data
US 2018/0249456 A1 Aug. 30, 2018

(30) Foreign Application Priority Data

Sep. 30, 2016 (WO) ............... PCT/CN2016/101209

(51) Int. Cl.
*H04W 72/04* (2009.01)
*H04W 72/08* (2009.01)
(Continued)

(52) U.S. Cl.
CPC ....... *H04W 72/0413* (2013.01); *H04L 1/1825* (2013.01); *H04L 1/1861* (2013.01);
(Continued)

(58) Field of Classification Search
CPC .......... H04W 72/0486; H04W 72/087; H04W 72/0412; H04L 1/1825; H04L 1/1861; H04L 5/0053
See application file for complete search history.

(56) References Cited

U.S. PATENT DOCUMENTS

2011/0053631 A1* 3/2011 Bottomley ............ H04W 52/08
  455/522
2015/0139073 A1* 5/2015 Buchwald ........... H04W 72/085
  370/327
(Continued)

FOREIGN PATENT DOCUMENTS

| CN | 102647263 A | 8/2012 |
|----|-------------|--------|
| CN | 105682237 A | 6/2016 |

(Continued)

OTHER PUBLICATIONS

Unknown, Author, "3rd Generation Partnership Project; Technical Specification Group Radio Access Network; Evolved Universal Terrestrial Radio Access (E-UTRA); Multiplexing and channel coding (Release 14)", 3GPP TS 36.212 V14.2.0, Mar. 2017, 1-197.
(Continued)

*Primary Examiner* — Gbemileke J Onamuti
(74) *Attorney, Agent, or Firm* — Murphy, Bilak & Homiller, PLLC

(57) ABSTRACT

Embodiments of the disclosure generally relate to determination of a UL control channel. A device selects, from candidate UL control channel categories, a target UL control channel category based on information about traffic between a network device and a terminal device. The candidate UL control channel categories at least include a first UL control channel category for high requirement traffic and a second UL control channel category for low requirement traffic.
(Continued)

Then, the device determines a UL control channel of the target UL control channel category for the terminal device.

22 Claims, 4 Drawing Sheets

(51) Int. Cl.
 *H04L 1/18* (2006.01)
 *H04L 5/00* (2006.01)
(52) U.S. Cl.
 CPC ....... *H04L 5/0053* (2013.01); *H04W 72/0486* (2013.01); *H04W 72/087* (2013.01)

(56) References Cited

U.S. PATENT DOCUMENTS

2016/0330789 A1* 11/2016 Goto .................. H04W 72/042
2017/0142591 A1* 5/2017 Vrzic .................. H04W 24/08

FOREIGN PATENT DOCUMENTS

| | | |
|---|---|---|
| CN | 105979597 A | 9/2016 |
| EP | 3043502 A1 | 7/2016 |

OTHER PUBLICATIONS

Unknown, Author, "Overall discussion on URLLC", LG Electronics, 3GPP TSG RAN WG1 Meeting #86, R1-166882, Gothenburg, Sweden, Aug. 22-26, 2016, 1-5.
Unknown, Author , "New PUCCH format for up to 32 CCs", CATT, 3GPP TSG RAN WG1 Meeting #82, R1-153911, Beijing, China, Aug. 24-28, 2015, 1-7.

* cited by examiner

METHOD AND DEVICE FOR DETERMINING UPLINK CONTROL CHANNEL

TECHNICAL FIELD

Embodiments of the present disclosure generally relate to the field of communications, and more particularly, to a method and device for determining uplink (UL) control channel.

BACKGROUND

With the development of communication technologies, multiple types of services or traffic have been proposed, for example, enhanced mobile broadband (eMBB), massive machine type communication (mMTC) and ultra-reliable and low latency communication (URLLC). These services require different Quality of Service (QoS), for instance, delay, data rate, packet loss rate, and so on.

Generally, URLLC requires low delay and/or high reliability, but usually it also has very low data rate and possible sparse data transmission. mMTC typically requires long battery lifetime but does not require low delay or high data rate, often combined with small infrequent packets. With regard to eMBB, it generally requires high data rate. Delay for eMBB may be strict but typically less strict than in URLLC.

Conventional, retransmission functionalities are used in multiple layers to avoid: Automatic Repeat Request (ARQ) in Transmission Control Protocol (TCP), Packet Data Convergence Protocol (PDCP) and Radio Link Control (RLC) and Hybrid Automatic Repeat Request (HARQ) in Medium Access Control (MAC) to avoid the packet loss in the whole transmission path including the transport network and Radio Access Network (RAN). For different services, there are different configurations of the mentioned layers according to the QoS requirement. For eMBB, the data is not so delay sensitive but the data rate should be as high as possible and the packet loss should be avoided. Hence the data retransmission of all layers shall be applied to avoid the packet loss. For real time video traffic, the TCP retransmission may not to applicable due to the delay budget and the data retransmission robustness relies on the RAN retransmission functionality such as RLC and MAC. For URLLC, the retransmission of TCP, PDCP and RLC may not be applicable due to the extremely small delay budget and the robustness of the data transmission mainly relies on the enhancement of the initial transmission and HARQ retransmissions.

URLLC may be used for factory automation. The target packet loss rate is relatively low, for example, $10^{-6} \sim 10^{-9}$. ARQ protocol might not be applicable in such cases due to the delay budget limit. The packet loss rate is mainly determined by the residual transmission error in MAC layer. In practice, the residual error of HARQ depends on not only the data decoding error but also the uplink control channel decoding error. For instance, the Negative Acknowledgement (NACK) to Acknowledgement (ACK) error has clear impact on the residual MAC error. The uplink control channel with 0.1% NACK to ACK error rate cannot meet the packet loss rate of the low rate for URLLC traffic.

SUMMARY

In general, embodiments of the present disclosure provide a solution for enhancing robustness of the uplink control channel.

In a first aspect, a method implemented at a device is provided. The device selects, from candidate UL control channel categories, a target UL control channel category based on information about traffic between a network device and a terminal device. The candidate UL control channel categories at least include a first UL control channel category for high requirement traffic and a second UL control channel category for low requirement traffic. Then, the device determines a UL control channel of the target UL control channel category for the terminal device. The device may be a network device or a terminal device. The corresponding computer program is also provided.

In one embodiment, selecting a target UL control channel category may comprise: determining whether the traffic is high requirement traffic or low requirement traffic based on one or more of: a type of traffic, a type of the terminal device, and a type of network slice for the traffic; in response to determining that the traffic is high requirement traffic, selecting the first UL control channel category as the target UL control channel category; and in response to determining that the traffic is a low requirement traffic, selecting the second UL control channel category as the target UL control channel category.

In one embodiment, determining whether the traffic is high requirement traffic or low requirement traffic may comprise one or more of: determining whether the type of traffic is ultra-reliable and low latency communication, URLLC; determining whether the type of the terminal device is for URLLC service: and determining whether the type of network slice is radio access network, RAN, slice for URLLC service.

In one embodiment, determining a UL control channel of the target UL control channel category may comprise: determining a transmission feature of the traffic based on the information about traffic, the transmission feature including one or more of: Cyclic Redundancy Check, CRC, length, coding rate, coding scheme, a code book, a repetition number of coding sequence, and size of the allocated resource; and determining a UL control channel of the target UL control channel category based on the transmission feature.

In one embodiment, the candidate UL control channel categories may be predefined according to one or more of: a type of traffic, a type of a terminal device, a type of network slice, Cyclic Redundancy Check, CRC, length, coding rate, coding scheme, a code book, a repetition number of coding sequence, and size of the allocated resource.

In one embodiment, a UL control channel of the first UL control channel category may support one or more of the following: URLLC service; a terminal device type for URLLC service: radio access network, RAN, slice for URLLC service; a CRC sequence exceeding a predetermined threshold CRC length; a coding rate exceeding a predetermined threshold rate; a high performance coding scheme: a code book with an encoding sequence exceeding a predetermined threshold coding length; a repetition number of coding sequence exceeding a predetermined threshold number; and a size of resource to be allocated exceeding a predetermined threshold size.

In one embodiment, the device may be the network device and the method may further comprise transmitting information about the determined UL control channel to the terminal device.

In a second aspect, a method implemented at a terminal device is provided. The terminal device receives information about a UL control channel from a network device. The UL control channel is of a target UL control channel category. The target UL control channel category is selected from candidate UL control channel categories based on information about traffic between the network device and the terminal device. The candidate UL control channel categories at least include a first UL control channel category for high requirement traffic and a second UL control channel category for low requirement traffic. Then, the terminal device transmits UL control information on the UL control channel to the network device. The corresponding computer program is also provided.

In one embodiment, the candidate UL control channel categories may be predefined according to one or more of: a type of traffic, a type of a terminal device, a type of network slice, Cyclic Redundancy Check, CRC, length, coding rate, coding scheme, a code book, a repetition number of coding sequence, and size of the allocated resource.

In one embodiment, a UL control channel of the first UL control channel category may support one or more of the following: URLLC service; a terminal device type for URLLC service; radio access network, RAN, slice for URLLC service; a CRC sequence exceeding a predetermined threshold CRC length; a coding rate exceeding a predetermined threshold rate; a high performance coding scheme; a code book with an encoding sequence exceeding a predetermined threshold coding length; a repetition number of coding sequence exceeding a predetermined threshold number; and a size of resource to be allocated exceeding a predetermined threshold size.

In a third aspect, an apparatus implemented at a device is provided. The apparatus includes a selecting unit and a determining unit. The selecting unit is configured to select, from candidate UL control channel categories, a target UL control channel category based on information about traffic between a network device and a terminal device. The candidate UL control channel categories at least include a first UL control channel category for high requirement traffic and a second UL control channel category for low requirement traffic. The determining unit is configured to a UL control channel of the target UL control channel category for the terminal device.

In a fourth aspect, an apparatus implemented at a terminal device is provided. The apparatus includes a receiving unit and a transmitting unit. The receiving unit is configured to receive information about an UL control channel from a network device. The UL control channel is of a target UL control channel category. The target UL control channel category is selected from candidate UL control channel categories based on information about traffic between the network device and the terminal device. The candidate UL control channel categories at least include a first UL control channel category for high requirement traffic and a second UL control channel category for low requirement traffic. The transmitting unit is configured to transmit UL control information on the UL control channel to the network device In a fifth aspect, a device is provided. The device includes: a processor and a memory. The memory contains instructions executable by the processor, whereby the processor being adapted to cause the device to perform the method according to the first aspect of the present disclosure.

In a sixth aspect, a terminal device is provided. The terminal device includes: a processor and a memory. The memory contains instructions executable by the processor, whereby the processor being adapted to cause the terminal device to perform the method according to the second aspect of the present disclosure.

According to various embodiments of the present disclosure, the decoding error of the UL control channel can match error rate requirements to meet QoS of different traffic types. In this way, the robustness of the uplink control channel is enhanced.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
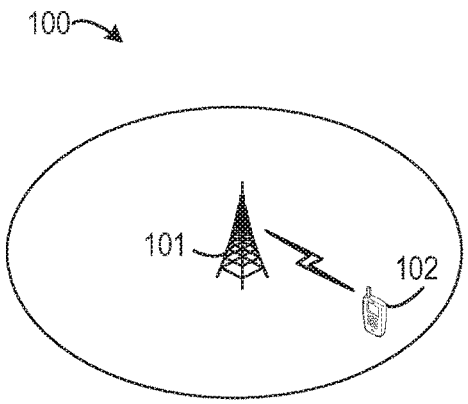
FIG. 1 shows a schematic diagram 100 of a wireless communication network.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G). the fourth generation (4G), 4.5G, the future fifth generation (5G) communication protocols, and/or any other protocols either currently known or to be developed in the future.

The term "network device" refers to a device in a wireless communication network via which a terminal device accesses the network and receives services therefrom. The network device refers a base station (BS), an access point (AP), a Mobile Management Entity (MME). Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico. and so forth.

Yet further examples of network device include multi-standard radio (MSR) radio equipment such as MSR BSs. network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, UE. or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an Internet of Things (IOT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Now some exemplary embodiments of the present disclosure will be described below with reference to the figures. Reference is first made to FIG. 1, which shows a schematic diagram 100 of a wireless communication network. There illustrates a network device 101 and a terminal device 102 in the wireless communication network. In the example of FIG. 1, the network device 101 provides service to the terminal device 102. The traffic between the network device 101 and the terminal device 102 may be URLLC traffic, eMBB traffic, mMTC traffic, and so on.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

Conventionally, in LTE, the error rate of ACK missed error shall below 1% and the NACK to ACK decoding error shall below 0.1%. The ACK flag is indicated using '1' and the NACK flag is indicated using '0'. In LTE release 13, massive carrier aggregation with 32 component carriers (CC) was introduced, Physical Uplink Control Channel (PUCCH) format 4 and 5 with an 8-bit CRC sequence was specified to conquer to enhance the HARQ A/N robustness.

The channel coding for HARQ-ACK is discussed below.

The following is described about a channel coding scheme for the simultaneous transmission of channel quality information and HARQ-ACK information in a subframe. When normal Cyclic Prefix (CP) is used for uplink transmission, the channel quality information is coded according to section 5.2.3.3 in 3GPP TS 36.212 with input bit sequence $a'_0, a'_1, a'_2, a'_3, \ldots, a'_{A'-1}$ and output bit sequence $b'_0, b'_1, b'_2, b'_3, \ldots, b'_{B'-1}$ where $B'=20$. The HARQ-ACK bits are denoted by $a''_0$ in case one HARQ-ACK bit or $a''_0, a''_1$ in case two HARQ-ACK bits are reported per subframe. Each positive acknowledgement (ACK) is encoded as a binary '1' and each negative acknowledgement (NAK) is encoded as a binary '0'. The output of this channel coding block for normal CP is denoted by $b_0, b_1, b_2, b_3, \ldots, b_{B-1}$, where $b_i = b'_i$, $i=0, \ldots, B'-1$.

In case one HARQ-ACK bit is reported per subframe:
$b_{B'} = a''_0$ and $B = (B'+1)$ In case two HARQ-ACK bits are reported per subframe:
$b_{B'} = a'_0$, $b_{B'+1} = a''_1$ and $B = (B'+2)$ When extended CP is used for uplink transmission, the channel quality information and the HARQ-ACK bits are jointly coded. The HARQ-ACK bits are denoted by $a''_0$ in case one HARQ-ACK bit or $[a''_0, a''_1]$ in case two HARQ-ACK bits are reported per subframe.

However, the target packet loss rate for URLLC traffic is relatively low, for example, $10^{-6} \sim 10^{-9}$. ARQ protocol might not be applicable in such cases due to the delay budget limit. The packet loss rate is mainly determined by the residual transmission error in MAC layer. In practice, the residual error of HARQ depends on not only the data decoding error but also the uplink control channel decoding error. For instance, the NACK to ACK error has clear impact on the residual MAC error. The uplink control channel with 0.1% NACK to ACK error rate cannot meet the packet loss rate of the low rate for URLLC traffic.

In order to solve the above and other potential problems, embodiments of the present disclosure provide solutions to determine a UL control channel adaptive to different traffic between a network device and a terminal device. In accordance with embodiments of the present disclosure, a target UL control channel category is selected, from candidate UL control channel categories, based on information about traffic between the network device and the terminal device. The candidate UL control channel categories at least include a first UL control channel category for high requirement traffic and a second UL control channel category for low requirement traffic. Then, a UL control channel of the target UL control channel category is determined for the terminal device. In this way, the decoding error of the UL control channel can match the residual MAC error rate requirements to meet the QoS of different traffic types. As a result, the robustness of the uplink control channel is enhanced.

Figure 2:
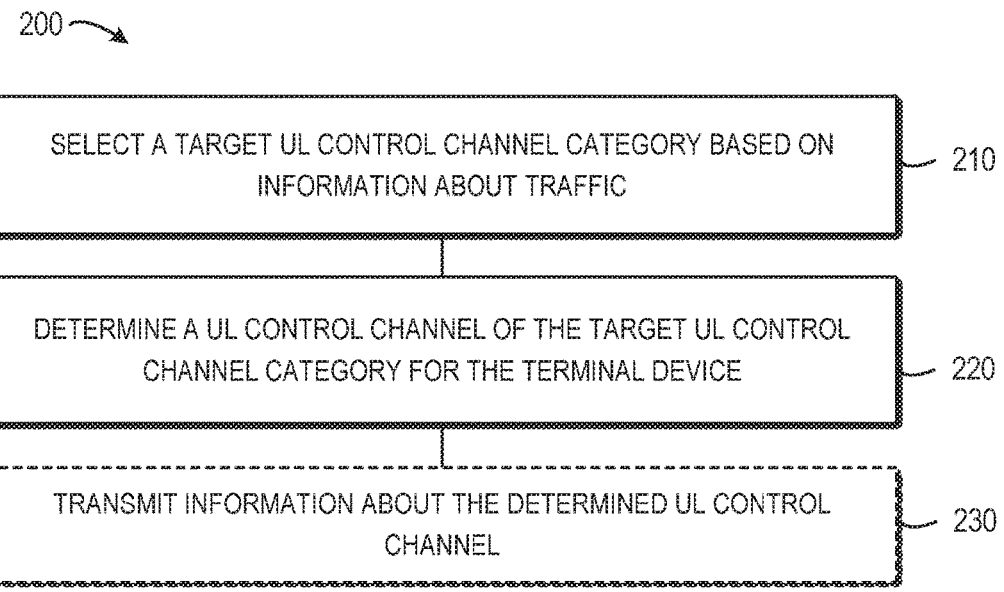
FIG. 2 shows a flowchart of a method 200 for determining a UL control channel in accordance with an embodiment of the present disclosure.

FIG. 2 shows a flowchart of a method 200 for determining a UL control channel in accordance with an embodiment of the present disclosure. With the method 200, the above and other potential deficiencies in the conventional approaches can be overcome. It would be appreciated by those skilled in the art that the method 200 may be implemented by a network device, such as a BS, a server, a controller or other suitable devices, or may be implemented by a terminal device, such as a mobile phone, a tablet, and so on. The network device may be, for example, but not limited to, the network device 101 of FIG. 1. The terminal device may be, for example, but not limited to. the network device 102 of FIG. 1.

The method 200 is entered at 210, where a target UL control channel category is selected, from candidate UL control channel categories, based on information about traffic between a network device and a terminal device, for example, the network device 101 and the terminal device 102. The candidate UL control channel categories at least include a first UL control channel category for high requirement traffic and a second UL control channel category for low requirement traffic. It is to be understood that the first and second UL control channel categories are just examples of the candidate UL control channel categories. In other embodiments of the present disclosure, the candidate UL control channel categories may include more than two category UL control channel category, for example, depending on transmission requirements (e.g., QoS levels) of the traffic. For example, in an embodiment, there may be three candidate UL control channel categories. The first candidate UL control channel category is for high requirement traffic, the second candidate UL control channel category is for middle requirement traffic, and the third candidate UL control channel category is for low requirement traffic.

In accordance with embodiments of the present disclosure, the candidate UL control channel categories may be predefined in a variety of ways. In some embodiments, the candidate UL control channel categories may be predefined according to one or more of: a type of traffic, a type of a terminal device, a type of network slice, a CRC length, a coding rate, a coding scheme, a code book, a repetition number of coding sequence, a size of the allocated resource, and/or the like.

Additionally, in some embodiments, the candidate UL control channel categories may be predefined such that UL control channels of the first UL control channel category support one or more of the following: a URLLC service, a terminal device type for a URLLC service, a RAN slice for a URLLC service, a CRC sequence exceeding a predetermined threshold CRC length, a coding rate exceeding a predetermined threshold rate, a high performance coding scheme, a code book with an encoding sequence exceeding a predetermined threshold coding length, a repetition number of coding sequence exceeding a predetermined threshold number, and a size of resource to be allocated exceeding a predetermined threshold size.

In other words, if a UL control channel supports the URLLC service, it may be predefined as a channel of the first UL control channel category for high requirement traffic. If a UL control channel supports the terminal device type (also referred to as "UE type") for a URLLC service, for example, a UE supporting the URLLC traffic, it may be predefined as a channel of the first UL control channel category for high requirement traffic. If a UL control channel supports the RAN slice for a URLLC service, it may be predefined as a channel of the first UL control channel category for high requirement traffic.

In some other embodiments, if a UL control channel supports a long CRC sequence, for example, a CRC sequence exceeding predetermined threshold CRC length, it may be predefined as a channel of the first UL control channel category for high requirement traffic. If a UL control channel supports a high coding rate, for example, a coding rate exceeding a predetermined threshold rate. it may be predefined as a channel of the first UL control channel category for high requirement traffic. If a UL control channel supports a high performance coding scheme, it may be predefined as a channel of the first UL control channel category for high requirement traffic. If a UL control channel supports a large code book, for example, a code book with an encoding sequence exceeding a predetermined threshold coding length, it may be predefined as a channel of the first UL control channel category for high requirement traffic. If a UL control channel supports a large repetition number of coding sequence, for example, a repetition number of coding sequence exceeding a predetermined threshold number, it may be predefined as a channel of the first UL control channel category for high requirement traffic. If a UL control channel supports a large a size of resource to be allocated for the traffic, for example, a size of resource to be allocated exceeding a predetermined threshold size, it may be predefined as a channel of the first UL control channel category for high requirement traffic.

It is to be understood that the above embodiments are illustrated for example, rather than limitation. Those skilled in the art may employ many other suitable ways to predefine the candidate UL control channel categories.

In accordance with embodiments of the present disclosure, the target UL control channel category may be determined in several ways. In some embodiments, it may be determined whether the traffic is high requirement traffic or low requirement traffic based on one or more of: a type of traffic, a type of the terminal device, and a type of network slice for the traffic. In response to determining that the traffic is high requirement traffic, the first UL control channel category may be selected as the target UL control channel category. In response to determining that the traffic is low requirement traffic, the second UL control channel category may be selected as the target UL control channel category.

In some embodiments, whether the traffic is high requirement traffic or low requirement traffic may be determined by determining whether the type of traffic is URLLC, determining whether the type of the terminal device is for URLLC service, and/or determining whether the type of network slice is RAN slice for URLLC service.

At 220, a UL control channel of the target UL control channel category is determined for the terminal device. The UL control channel may be determined in a variety of ways. In some embodiments, the UL control channel may be randomly determined as a UL control channel of the target UL control channel category.

Alternatively, the UL control channel may be determined according to the information about the traffic, for example, QoS level, bit error rate, and so on. A transmission feature of the traffic may be determined based on the information about the traffic. The transmission feature may include one or more of: Cyclic Redundancy Check, CRC, length, coding rate, coding scheme, a code book, a repetition number of coding sequence, a size of the allocated resource, and so on. Then, a UL control channel of the target UL control channel category may be determined based on the transmission feature.

In accordance with embodiments of the present disclosure, the method 200 may be implemented at a network device or a terminal device. In some embodiments, if the method 200 is performed at the network device, the network device may transmit, at 230, information about the determined UL control channel to the terminal device. As such, the terminal device may transmit the UL control information by using the UL control channel determined at the network device.

In some alternative embodiment, if the method 200 is performed at the terminal device, the terminal device may transmit the UL control information by using the UL control channel determined by itself. Optionally, the terminal device may transmit information about the determined UL control channel to the network device, if necessary.

In view of the forgoing, the decoding error of the UL control channel can match error rate requirements to meet QoS of different traffic types. In this way, the robustness of the uplink control channel is enhanced.

Figure 3:
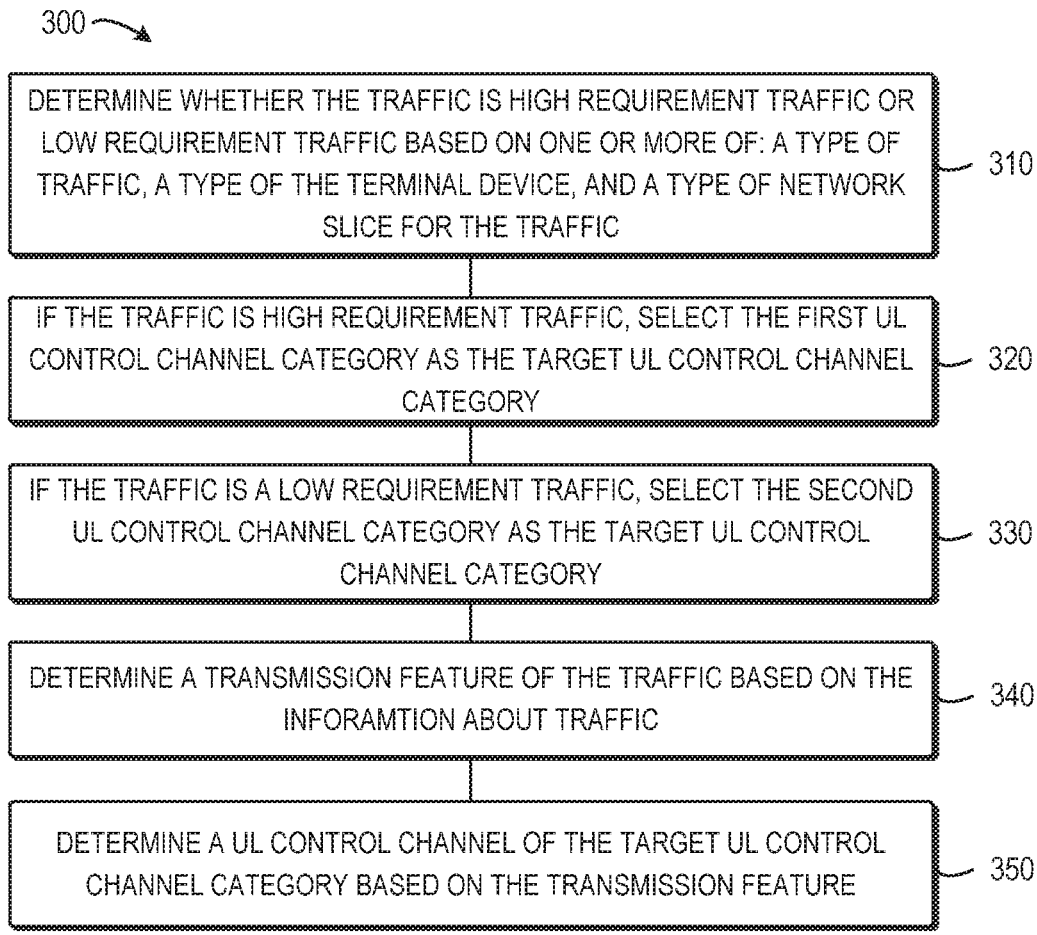
FIG. 3 shows a flowchart of a method 300 for determining a UL control channel in accordance with an embodiment of the present disclosure.

Reference is now made to FIG. 3, which shows a flowchart of a method 300 for determining a UL control channel in accordance with an embodiment of the present disclosure. It would be appreciated by those skilled in the art that the method 300 is an implementation of the method 200 and may be implemented at a device, for example a network device or a terminal device. It is to be understood that the method 300 may be implemented in several ways as discussed above, and the method 300 is only one example instead of limitation.

The method 300 is entered at 310, where whether the traffic is high requirement traffic or low requirement traffic is determined based on one or more of: a type of traffic, a type of the terminal device, and a type of network slice for the traffic. In some embodiments, the device may determine whether the type of traffic is URLLC. If so, the device may determine the traffic is high requirement traffic. Otherwise, the device may determine the traffic is low requirement traffic, for example.

Alternatively, in some embodiments, the device may determine whether the type of the terminal device is for URLLC service. If so, the device may determine the traffic is high requirement traffic. Otherwise, the device may determine the traffic is low requirement traffic, for example.

Alternatively, in some embodiments, the device may determine whether the type of network slice is RAN slice for URLLC service. If so, the device may determine the traffic is high requirement traffic. Otherwise, the device may determine the traffic is low requirement traffic, for example.

At 320, in response to determining that the traffic is high requirement traffic, the first UL control channel category is selected as the target UL control channel category. At 330, in response to determining that the traffic is a low requirement traffic, the second UL control channel category is selected as the target UL control channel category.

At 340, a transmission feature of the traffic is determined based on the information about traffic. The transmission feature may include Cyclic Redundancy Check, CRC, a length, a coding rate, a coding scheme, a code book, a repetition number of coding sequence, a size of the allocated resource, and/or the like. At 350, a UL control channel of the target UL control channel category is determined based on the transmission feature.

Figure 4:
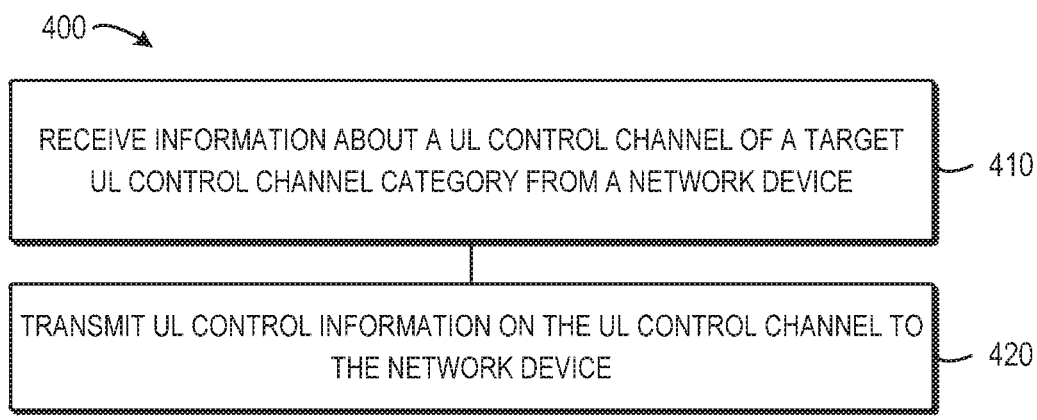
FIG. 4 shows a flowchart of a method 400 performed at a terminal device in accordance with an embodiment of the present disclosure.

More operations performed at the terminal device side will be discussed with respect to the following embodiments of the present disclosure. FIG. 4 shows a flowchart of a method 400 performed at a terminal device in accordance with an embodiment of the present disclosure. With the method 400, the above and other potential deficiencies in the conventional approaches can be overcome. It would be appreciated by those skilled in the art that the method 400 may be implemented by a terminal device, such as a UE or other suitable devices. The terminal device may be, for example, but not limited to, the terminal device 102 of FIG. 1.

The method 400 is entered at 410, where the terminal device receives information about a UL control channel from a network device. The UL control channel is of a target UL control channel category. The target UL control channel category is selected from candidate UL control channel categories based on information about traffic between the network device and the terminal device. The candidate UL control channel categories may include two or more UL control channel categories, for example, but not limited to a first UL control channel category for high requirement traffic and a second UL control channel category for low requirement traffic.

At 420. the terminal device transmits UL control information on the UL control channel to the network device. The UL control information may include, for example, ACK/NACK, Channel Quality Indicator (CQI), Precoding Matrix Indicator (PMI), Rank Indication (RI), and other suitable uplink control information.

In this way, the UL control information can be transmitted on a UL control channel that can match transmission requirements of different traffic types. As a result, the robustness of the uplink control channel is enhanced.

Now more embodiments are provided below for discussing more details of the present disclosure. In these embodiments, the candidate UL control channel categories may be also referred to as uplink control channel sets. Multiple uplink control channel sets with different quality targets (for example, QoS requirements or QoS targets) are defined. Different a type of traffic (also referred to as traffic type), a type of the terminal device (also referred to as UE type), and/or a type of network slice (also referred to as RAN slice type) can be configured/preconfigured to use different uplink control channel sets according to associated QoS targets.

As a first embodiment, there are two sets of uplink control channels: the first uplink control channel set targets extremely low decoding error rate in terms of ACK missing rate and/or NACK to ACK error rate; the second uplink control channel set targets good enough decoding error rate in terms of ACK missing rate and/or NACK to ACK error rate for non-URLLC traffic. Note that the description given herein focus on two sets of uplink control channels. However, the concepts disclosed herein are not limited to two sets, there may be more than two sets. Further, three examples for uplink control channel configuration are listed below.

EXAMPLE 1

Traffic Specific Uplink Control Channel Set Configuration

The URLLC traffic may be configured to use the first uplink control channel set and the eMBB and video traffic may be configured to use the second uplink control channel set.

EXAMPLE 2

RAN Slice Specific Uplink Control Channel Set Configuration

The RAN slice for URLLC service providing may be configured to use the first uplink channel set and the RAN slice for eMBB, video and MTC service providing may be configured to use the second uplink channel set.

EXAMPLE 3

UE Type Specific Uplink Control Channel Set Configuration

The UE category for URLLC service may be configured to use the first uplink control channel set and the UE category without URLLC service capability may be configured to use the second uplink control channel set.

As a second embodiment, different uplink channel sets may use different CRC length. The first uplink control channel set may use longer CRC sequence to meeting the extremely low decoding error rate and the second uplink control channel set may not use CRC or just use a short CRC sequence to meet the good enough decoding error rate. For instance, the first uplink channel set uses 16-bit CRC or 32-bit CRC sequence and the second uplink channel set does not use CRC or uses a 8-bit CRC sequence. With adaptive CRC length according to the requirements, it can reduce the CRC overhead efficiently.

As a third embodiment, different uplink channel sets use different encoding scheme. One basic principle may be that the number of coded bits for the first uplink control channel set is larger than that for the second uplink control channel set for the same number of ACK/NACK bits. According to this embodiment, the low decoding error for the first uplink channel set is achieved by enhancing the coding gain. There are different examples to implement this embodiment.

EXAMPLE 1

Different coding rate may be used for different uplink channel sets. In the first uplink control channel set, coding rate r1 is used and in the second uplink control channel set, coding rate r2 is used, wherein r1<r2. Generally, a low coding rate corresponds to a low decoding error, thus channels in the first uplink control channel set may be more suitable for high requirement traffic.

EXAMPLE 2

Different channel coding scheme may be used for different uplink control channel sets. For example, channel coding scheme may be Reed-Muller code, convolution code, turbo code, LDPC code, and polar code etc or variation of these codes.

EXAMPLE 3

Different code book may be used for different uplink channel sets for the encoding of ACK/NACK bits. One ACK/NACK bit is mapped to longer sequence using the first code book for the first uplink control channel set and shorter sequence using the second code book for the second uplink control channel set.

EXAMPLE 4

Figure 5:
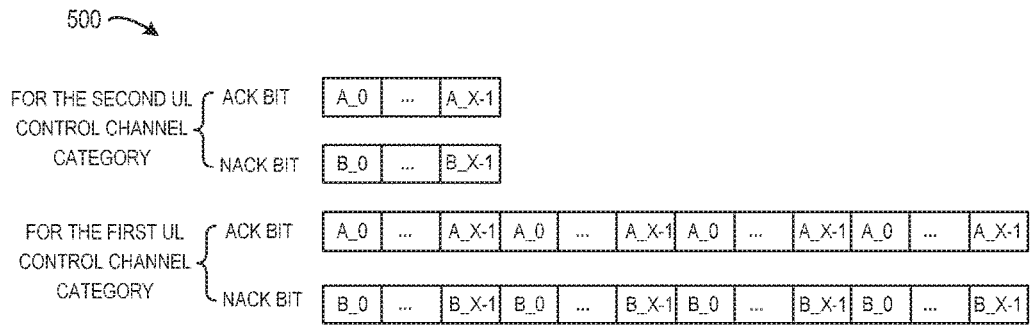
FIG. 5 shows a diagram of HARQ ACK/NACK encoding for different UL control channel categories in accordance with an embodiment of the present disclosure.

The same encoding sequence is used for different uplink channel sets but there are different numbers of repetitions for the first and the second uplink control channel set. The number of repetitions for the first uplink control channel set is larger than that for the second uplink control channel set. FIG. 5 shows a diagram of HARQ ACK/NACK encoding for different UL control channel categories in accordance with an embodiment of the present disclosure.

As a fourth embodiment, there may be different resource allocation rules used for different uplink control channel sets.

EXAMPLE 1

The uplink control channel is transmitted similarly as PUCCH in LTE. If there is the same number of HARQ ACK/NACK bits to be transmitted, more PUCCH resources are allocated for the uplink control channel of the first uplink control channel set than that of the second one.

For one instance, to carry the same number of HARQ ACK/NACK bits, one uplink control channel from the first uplink control channel set takes two PRBs but one uplink control channel from the second uplink control channel only takes only one PRB.

For another instance, for the uplink control channels to carry the same number of HARQ ACK/NACK bits over the same number of PRBs, the multiplexing level of the uplink control channels from the first uplink control channel set is lower than that from the second uplink control channel set. For instance, up to 2 uplink control channels may be multiplexed over one PRB for the first uplink control channel set while up to 6 uplink control channels may be multiplexed over one PRB for the second uplink control channel set.

EXAMPLE 2

The uplink control channel is transmitted in embedded in the PUSCH, similarly as uplink control information carried by PUSCH in LTE. In this example, the factor that affects the length of the coded sequence may be configured. As one instance, the beta value (i.e. $\beta_{offset}^{HARQ-ACK}$ in Section 5.2.2.6 of 3GPP TS 36.212) shall be configured respectively for each uplink control channel set. For the same number of HARQ ACK/NACK bits, the beta value shall be configured to larger value for the first uplink control channel set than for the second uplink control channel set to reserve more REs for uplink control information transmission. As another instance, two beta value sets may be designed, each value set is associated with one uplink control channel set. In the first beta value set, larger values are included. In the second beta value set, smaller values are included. One or more values are selected from each set of beta values for the resource allocation of each uplink control channels.

It is to be understood that, the above examples or embodiments are discussed for illustration, rather than limitation. Those skilled in the art would appreciate that there may be many other embodiments or examples within the scope of the present disclosure.

Figure 6:
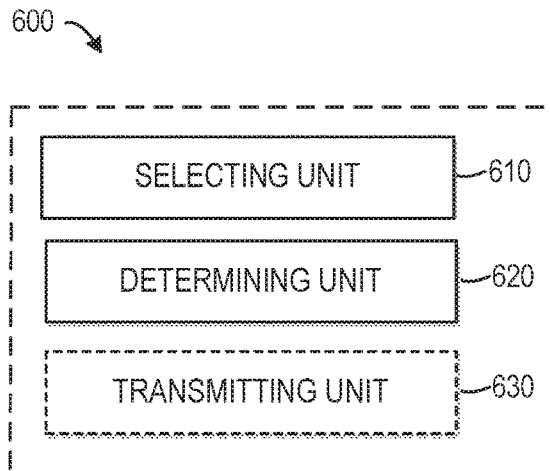
FIG. 6 shows a block diagram of an apparatus 600 implemented at a device in accordance with an embodiment of the present disclosure.

Now reference is made to FIG. 6, which shows a block diagram of an apparatus 600 implemented at a device in accordance with an embodiment of the present disclosure. It would be appreciated that the apparatus 600 may be implemented at a network device, a terminal device, or any other suitable device.

As shown, the apparatus 600 includes a selecting unit 610 and a determining unit 620. The selecting unit 610 is configured to select, from candidate UL control channel categories, a target UL control channel category based on information about traffic between a network device and a terminal device. The candidate UL control channel categories at least include a first UL control channel category for high requirement traffic and a second UL control channel category for low requirement traffic. The determining unit 620 is configured to determine a UL control channel of the target UL control channel category for the terminal device.

In an embodiment, the selecting unit 610 may be further configured to: determine whether the traffic is high requirement traffic or low requirement traffic based on one or more of: a type of traffic, a type of the terminal device, and a type of network slice for the traffic: in response to determining that the traffic is high requirement traffic, select the first UL control channel category as the target UL control channel category; and in response to determining that the traffic is a low requirement traffic, select the second UL control channel category as the target UL control channel category.

In an embodiment, the selecting unit 610 may be further configured to perform one or more of: determining whether the type of traffic is ultra-reliable and low latency communication. URLLC: determining whether the type of the terminal device is for URLLC service; and determining whether the type of network slice is radio access network, RAN, slice for URLLC service.

In an embodiment, the determining unit 620 may be further configured to: determine a transmission feature of the traffic based on the information about traffic, the transmission feature including one or more of: Cyclic Redundancy Check, CRC, length, coding rate, coding scheme, a code book, a repetition number of coding sequence, and size of the allocated resource; and determine a UL control channel of the target UL control channel category based on the transmission feature.

In an embodiment, the candidate UL control channel categories may be predefined according to one or more of: a type of traffic, a type of a terminal device, a type of network slice, Cyclic Redundancy Check, CRC, length. coding rate, coding scheme, a code book, a repetition number of coding sequence, and size of the allocated resource.

In an embodiment, a UL control channel of the first UL control channel category may support one or more of the following: URLLC service; a terminal device type for URLLC service; radio access network, RAN, slice for URLLC service; a CRC sequence exceeding a predetermined threshold CRC length; a coding rate exceeding a predetermined threshold rate; a high performance coding scheme; a code book with an encoding sequence exceeding a predetermined threshold coding length; a repetition number of coding sequence exceeding a predetermined threshold number; and a size of resource to be allocated exceeding a predetermined threshold size.

In an embodiment, optionally, the apparatus 600 may further comprise a transmitting unit 630 configured to transmit information about the determined UL control channel to the terminal device.

Figure 7:
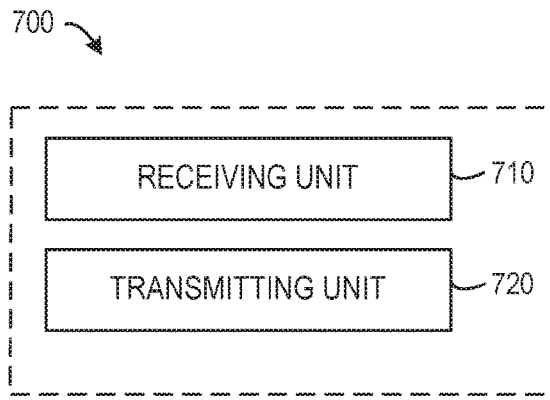
FIG. 7 shows a block diagram of an apparatus 700 implemented at a terminal device in accordance with an embodiment of the present disclosure.

Now reference is made to FIG. 7, which shows a block diagram of an apparatus 700 implemented at a terminal device in accordance with an embodiment of the present disclosure. It would be appreciated that the apparatus 700 may be implemented at a network device, a terminal device, or any other suitable device.

As shown, the apparatus 700 includes a receiving unit 710 and a transmitting unit 720. The selecting unit 710 is configured to receive information about a UL control channel from a network device. The UL control channel is of a target UL control channel category. The target UL control channel category is selected from candidate UL control channel categories based on information about traffic between the network device and the terminal device. The candidate UL control channel categories at least include a first UL control channel category for high requirement traffic and a second UL control channel category for low requirement traffic. The transmitting unit 720 is configured to transmit UL control information on the UL control channel to the network device.

In an embodiment, the candidate UL control channel categories may be predefined according to one or more of: a type of traffic, a type of a terminal device, a type of network slice, Cyclic Redundancy Check, CRC, length, coding rate, coding scheme, a code book, a repetition number of coding sequence, and size of the allocated resource.

In an embodiment, a UL control channel of the first UL control channel category may support one or more of the following: URLLC service; a terminal device type for URLLC service; radio access network, RAN, slice for URLLC service; a CRC sequence exceeding a predetermined threshold CRC length; a coding rate exceeding a predetermined threshold rate; a high performance coding scheme; a code book with an encoding sequence exceeding a predetermined threshold coding length; a repetition number of coding sequence exceeding a predetermined threshold number; and a size of resource to be allocated exceeding a predetermined threshold size.

It should be appreciated that components included in the apparatus 600 correspond to the operations of the methods 200 and 300, and components included in the apparatus 700 correspond to the operations of the method 400. Therefore, all operations and features described above with reference to FIGS. 2 and 3 are likewise applicable to the components included in the apparatus 600 and have similar effects, and all operations and features described above with reference to FIG. 4 are likewise applicable to the components included in the apparatus 700 and have similar effects. For the purpose of simplification, the details will be omitted.

The components included in the apparatuses 600 and 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the apparatuses 600 and 700 may be implemented, at least in part, by one or more hardware logic components. For example, and without limitation, illustrative types of hardware logic components that can be used include Field-programmable Gate Arrays (FPGAs), Application-specific Integrated Circuits (ASICs). Application-specific Standard Products (ASSPs), System-on-a-chip systems (SOCs), Complex Programmable Logic Devices (CPLDs), and the like.

In accordance with embodiments of the present disclosure, there is provided an apparatus implemented at a device. The apparatus includes: means for selecting, from candidate uplink, UL. control channel categories, a target UL control channel category based on information about traffic between a network device and a terminal device, the candidate UL control channel categories at least including a first UL control channel category for high requirement traffic and a second UL control channel category for low requirement traffic; and means for determining a UL control channel of the target UL control channel category for the terminal device.

In one embodiment, means for selecting a target UL control channel category may comprise: means for determining whether the traffic is high requirement traffic or low requirement traffic based on one or more of: a type of traffic, a type of the terminal device, and a type of network slice for the traffic; means for, in response to determining that the traffic is high requirement traffic, selecting the first UL control channel category as the target UL control channel category, and means for, in response to determining that the traffic is a low requirement traffic, selecting the second UL control channel category as the target UL control channel category.

In one embodiment, means for determining whether the traffic is high requirement traffic or low requirement traffic may comprise one or more of: means for determining whether the type of traffic is ultra-reliable and low latency communication, URLLC; means for determining whether the type of the terminal device is for URLLC service; and means for determining whether the type of network slice is radio access network, RAN, slice for URLLC service.

In one embodiment, means for determining a UL control channel of the target UL control channel category may comprise: means for determining a transmission feature of the traffic based on the information about traffic, the transmission feature including one or more of: Cyclic Redundancy Check. CRC. length, coding rate, coding scheme, a code book, a repetition number of coding sequence, and size of the allocated resource; and means for determining a UL control channel of the target UL control channel category based on the transmission feature.

In one embodiment, the candidate UL control channel categories may be predefined according to one or more of: a type of traffic, a type of a terminal device, a type of network slice, Cyclic Redundancy Check, CRC, length, coding rate, coding scheme, a code book, a repetition number of coding sequence, and size of the allocated resource.

In one embodiment, a UL control channel of the first UL control channel category may support one or more of the following: URLLC service; a terminal device type for URLLC service; radio access network, RAN, slice for URLLC service; a CRC sequence exceeding a predetermined threshold CRC length; a coding rate exceeding a predetermined threshold rate: a high performance coding scheme; a code book with an encoding sequence exceeding a predetermined threshold coding length; a repetition number of coding sequence exceeding a predetermined threshold number; and a size of resource to be allocated exceeding a predetermined threshold size.

In one embodiment, the device may be the network device and the apparatus may further comprise means for transmitting information about the determined UL control channel to the terminal device.

In accordance with embodiments of the present disclosure, there is provided an apparatus implemented at a terminal device. The apparatus includes: means for receiving information about an uplink, UL, control channel from a network device, wherein the UL control channel is of a target UL control channel category, the target UL control channel category is selected from candidate UL control channel categories based on information about traffic between the network device and the terminal device, and the candidate UL control channel categories at least include a first UL control channel category for high requirement traffic and a second UL control channel category for low requirement traffic; and means for transmitting UL control information on the UL control channel to the network device In one embodiment, the candidate UL control channel categories may be predefined according to one or more of: a type of traffic, a type of a terminal device, a type of network slice, Cyclic Redundancy Check, CRC, length, coding rate, coding scheme, a code book, a repetition number of coding sequence, and size of the allocated resource.

In one embodiment, a UL control channel of the first UL control channel category may support one or more of the following: URLLC service; a terminal device type for URLLC service; radio access network, RAN, slice for URLLC service; a CRC sequence exceeding a predetermined threshold CRC length; a coding rate exceeding a predetermined threshold rate: a high performance coding scheme; a code book with an encoding sequence exceeding a predetermined threshold coding length; a repetition number of coding sequence exceeding a predetermined threshold number; and a size of resource to be allocated exceeding a predetermined threshold size.

Figure 8:
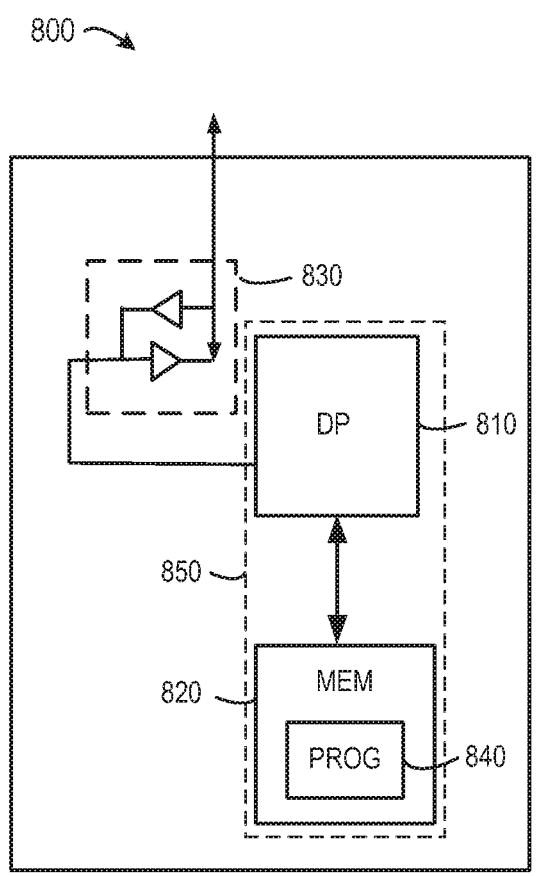
FIG. 8 shows a simplified block diagram 800 of a device that is suitable for use in implementing embodiments of the present disclosure.

FIG. 8 shows a simplified block diagram of a device 800 that is suitable for implementing embodiments of the present disclosure. It would be appreciated that the device 800 may be implemented as at least a part of, for example, the network device 101 or the terminal device 102.

As shown, the device 800 includes a communicating means 830 and a processing means 850. The processing means 850 includes a data processor (DP) 810, a memory (MEM) 820 coupled to the DP 810. The communicating means 830 is coupled to the DP 810 in the processing means 850. The MEM 820 stores a program (PROG) 840. The communicating means 830 is for communications with other devices, which may be implemented as a transceiver for transmitting/receiving signals.

In some embodiments where the device 800 acts as a network device, the processing means 850 may be configured to generate an occurrence indication for indicating a subsequent occurrence of access information, and the communicating means 830 may be configured to transmit the occurrence indication in association with a system signature. In some other embodiments where the device 800 acts as a terminal device, the processing means 850 may be configured to detect, in response to detecting a system signature, an occurrence indication indicating a subsequent occurrence of access information, and the communicating means 830 may be configured to receive the access information based on the occurrence indication.

The PROG 840 is assumed to include program instructions that, when executed by the associated DP 810, enable the device 800 to operate in accordance with the embodiments of the present disclosure, as discussed herein with the method 200, 300 or 400. The embodiments herein may be implemented by computer software executable by the DP 810 of the device 800, or by hardware, or by a combination of software and hardware. A combination of the data processor 810 and MEM 820 may form processing means 850 adapted to implement various embodiments of the present disclosure.

The MEM 820 may be of any type suitable to the local technical environment and may be implemented using any suitable data storage technology, such as semiconductor based memory devices, magnetic memory devices and systems. optical memory devices and systems, fixed memory and removable memory, as non-limiting examples. While only one MEM is shown in the device 800, there may be several physically distinct memory modules in the device 800. The DP 810 may be of any type suitable to the local technical environment, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system. apparatus, or device, or any suitable combination of the foregoing. More specific examples of the machine readable storage medium would include an electrical connection having one or more wires, a portable computer diskette, a hard disk, a random access memory (RAM). a read-only memory (ROM). an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines. programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a device, comprising:
    selecting, from candidate uplink (UL) control channel categories, a target UL control channel category, based on information about traffic between a network device and a terminal device, the candidate UL control channel categories at least including a first UL control channel category for high requirement traffic and a second UL control channel category for low requirement traffic; and
    determining a UL control channel of the target UL control channel category for the terminal device.

2. The method of claim 1, wherein selecting a target UL control channel category comprises:
   determining whether the traffic is high requirement traffic or low requirement traffic based on one or more of: a type of traffic, a type of the terminal device, and a type of network slice for the traffic;
   in response to determining that the traffic is high requirement traffic, selecting the first UL control channel category as the target UL control channel category; and
   in response to determining that the traffic is a low requirement traffic, selecting the second UL control channel category as the target UL control channel category.

3. The method of claim 2, wherein determining whether the traffic is high requirement traffic or low requirement traffic comprises one or more of:
   determining whether the type of traffic is ultra-reliable and low latency communication (URLLC);
   determining whether the type of the terminal device is for URLLC service; and
   determining whether the type of network slice is radio access network (RAN) slice for URLLC service.

4. The method of claim 1, wherein determining a UL control channel of the target UL control channel category comprises:
   determining a transmission feature of the traffic based on the information about traffic, the transmission feature including one or more of: Cyclic Redundancy Check (CRC) length, coding rate, coding scheme, a code book, a repetition number of coding sequence, and size of the allocated resource; and
   determining a UL control channel of the target UL control channel category based on the transmission feature.

5. The method of claim 1, wherein the candidate UL control channel categories are predefined according to one or more of: a type of traffic, a type of a terminal device, a type of network slice, a Cyclic Redundancy Check (CRC) length, a coding rate, a coding scheme, a code book, a repetition number of coding sequence, and a size of the allocated resource.

6. The method of claim 5, wherein the candidate UL control channel categories are predefined such that UL control channels of the first UL control channel category support one or more of the following:
   a URLLC service,
   a terminal device type for a URLLC service,
   a radio access network (RAN) slice for a URLLC service,
   a CRC sequence exceeding a predetermined threshold CRC length,
   a coding rate exceeding a predetermined threshold rate,
   a high-performance coding scheme,
   a code book with an encoding sequence exceeding a predetermined threshold coding length,
   a repetition number of coding sequence exceeding a predetermined threshold number, and
   a size of resource to be allocated exceeding a predetermined threshold size.

7. The method of claim 1, wherein the device is the network device and the method further comprises:
   transmitting information about the determined UL control channel to the terminal device.

8. A method implemented at a terminal device, comprising:
   receiving information about an uplink (UL) control channel from a network device, wherein the UL control channel is of a target UL control channel category, the target UL control channel category is selected from candidate UL control channel categories based on information about traffic between the network device and the terminal device, and the candidate UL control channel categories at least include a first UL control channel category for high requirement traffic and a second UL control channel category for low requirement traffic; and
   transmitting UL control information on the UL control channel to the network device.

9. The method of claim 8, wherein the candidate UL control channel categories are predefined according to one or more of: a type of traffic, a type of a terminal device, a type of network slice, Cyclic Redundancy Check (CRC) length, coding rate, coding scheme, a code book, a repetition number of coding sequence, and size of the allocated resource.

10. The method of claim 8, wherein a UL control channel of the first UL control channel category supports one or more of the following:
    URLLC service;
    a terminal device type for URLLC service;
    radio access network (RAN) slice for URLLC service;
    a CRC sequence exceeding a predetermined threshold CRC length;
    a coding rate exceeding a predetermined threshold rate;
    a high-performance coding scheme;
    a code book with an encoding sequence exceeding a predetermined threshold coding length;
    a repetition number of coding sequence exceeding a predetermined threshold number; and
    a size of resource to be allocated exceeding a predetermined threshold size.

11. A device, comprising:
    a processor; and
    a memory operatively coupled to the processor and storing program instructions for execution by the processor, whereby the device is configured to:
      select, from candidate uplink (UL) control channel categories, a target UL control channel category based on information about traffic between a network device and a terminal device, the candidate UL control channel categories at least including a first UL control channel category for high requirement traffic and a second UL control channel category for low requirement traffic; and
      determine a UL control channel of the target UL control channel category for the terminal device.

12. The device of claim 11, wherein the device is further configured to:
    determine whether the traffic is high requirement traffic or low requirement traffic based on one or more of: a type of traffic, a type of the terminal device, and a type of network slice for the traffic;
    in response to determining that the traffic is high requirement traffic, select the first UL control channel category as the target UL control channel category; and
    in response to determining that the traffic is a low requirement traffic, select the second UL control channel category as the target UL control channel category.

13. The device of claim 12, wherein the device is further configured to perform one or more of:
    determining whether the type of traffic is ultra-reliable and low latency communication (URLLC);
    determining whether the type of the terminal device is for URLLC service; and
    determining whether the type of network slice is radio access network (RAN) slice for URLLC service.

14. The device of claim 11, wherein the device is further configured to:
- determine a transmission feature of the traffic based on the information about traffic, the transmission feature including one or more of: Cyclic Redundancy Check (CRC) length, coding rate, coding scheme, a code book, a repetition number of coding sequence, and size of the allocated resource; and
- determine a UL control channel of the target UL control channel category based on the transmission feature.

15. The device of claim 11, wherein the candidate UL control channel categories are predefined according to one or more of: a type of traffic, a type of a terminal device, a type of network slice, a Cyclic Redundancy Check (CRC) length, a coding rate, a coding scheme, a code book, a repetition number of coding sequence, and a size of the allocated resource.

16. The device of claim 15, wherein the candidate UL control channel categories are predefined such that UL control channels of the first UL control channel category support one or more of the following:
- a URLLC service,
- a terminal device type for a URLLC service,
- a radio access network (RAN) slice for a URLLC service,
- a CRC sequence exceeding a predetermined threshold CRC length,
- a coding rate exceeding a predetermined threshold rate,
- a high performance coding scheme,
- a code book with an encoding sequence exceeding a predetermined threshold coding length,
- a repetition number of coding sequence exceeding a predetermined threshold number, and
- a size of resource to be allocated exceeding a predetermined threshold size.

17. The device of claim 11, wherein the device is the network device and the device further comprises:
- a transmitter configured to transmit information about the determined UL control channel to the terminal device.

18. A terminal device, comprising:
- a receiver configured to receive information about an uplink (UL) control channel from a network device, wherein the UL control channel is of a target UL control channel category, the target UL control channel category is selected from candidate UL control channel categories based on information about traffic between the network device and the terminal device, and the candidate UL control channel categories at least include a first UL control channel category for high requirement traffic and a second UL control channel category for low requirement traffic; and
- a transmitter configured to transmit UL control information on the UL control channel to the network device.

19. The terminal device of claim 18, wherein the candidate UL control channel categories are predefined according to one or more of: a type of traffic, a type of a terminal device, a type of network slice, Cyclic Redundancy Check (CRC) length, coding rate, coding scheme, a code book, a repetition number of coding sequence, and size of the allocated resource.

20. The terminal device of claim 18, wherein a UL control channel of the first UL control channel category supports one or more of the following:
- URLLC service;
- a terminal device type for URLLC service;
- radio access network (RAN) slice for URLLC service;
- a CRC sequence exceeding a predetermined threshold CRC length;
- a coding rate exceeding a predetermined threshold rate;
- a high performance coding scheme;
- a code book with an encoding sequence exceeding a predetermined threshold coding length;
- a repetition number of coding sequence exceeding a predetermined threshold number; and
- a size of resource to be allocated exceeding a predetermined threshold size.

21. A non-transitory computer-readable medium comprising, stored thereupon, a computer program including instructions that, when executed on a processor of a device, cause the device to perform the method of claim 1.

22. A non-transitory computer-readable medium comprising, stored thereupon, a computer program including instructions that, when executed on a processor of a terminal device, cause the terminal device to perform the method of claim 8.

* * * * *